United States Patent

Nagare et al.

[11] 4,020,639
[45] May 3, 1977

[54] OVAL PIPE WITH A FLAT BASE

[75] Inventors: Syoji Nagare, Kusatsu; Kozo Osawa, Otsu, both of Japan

[73] Assignee: Sekisui Kagaku Kogyo Kabushiki Kaisha, Osaka, Japan

[22] Filed: Dec. 29, 1975

[21] Appl. No.: 645,134

[30] Foreign Application Priority Data

Dec. 26, 1974 Japan .......................... 50-3608[U]

[52] U.S. Cl. .................................. 61/10; 138/105; 138/106; 248/49
[51] Int. Cl.² ........................................ E02B 13/00
[58] Field of Search ............. 61/10, 12, 11, 13, 14; 138/106, 105, 107; 248/49; 210/170

[56] References Cited

UNITED STATES PATENTS

| 429,041 | 5/1890 | Lynch | 138/106 |
| 455,926 | 7/1891 | Ogden | 138/106 X |
| 2,003,580 | 6/1935 | Craighead | 138/106 |

FOREIGN PATENTS OR APPLICATIONS

| 406,176 | 12/1909 | France | 138/106 |

*Primary Examiner*—Jacob Shapiro
*Attorney, Agent, or Firm*—Sughrue, Rothwell, Mion, Zinn & Macpeak

[57] ABSTRACT

The installation of pipes having oval cross sections is made easier by including an installation portion which has a flat base perpendicular to the major axis of the oval cross section.

1 Claim, 2 Drawing Figures

OVAL PIPE WITH A FLAT BASE

BACKGROUND OF THE INVENTION

The present invention relates to oval shaped discharge pipes particularly adapted to be used for the discharge of drainage or sewerage.

It is considered desirable to use a synthetic resin pipe having an oval cross sectional shape, such as ellipsoidal or one similar thereto, instead of a more conventional round synthetic resin pipe having true circular cross section to discharge water or sewage. The advantage of an oval shaped pipe over a round pipe of similar cross sectional area, is that the oval pipe, if laid with the longest cross sectional dimension perpendicular to the horizontal, will have a larger depth of water therein at low water periods. This allows the water to maintain a considerable speed and prevents the accumulation of solid filth or sedimentation. Accordingly the oval internal shape of such pipes makes them particularly useful for drainage or sewerage pipes. However, the external cross sectional shape of the pipes is also oval and that causes numerous difficulties in the instaloation of such pipes. For example, to achieve the benefit of the oval internal cross section, it is necessary to lay the pipes underground with their longitudinal axes directed vertically, but it is difficult to lay the pipes with their longitudinal axes directed precisely vertical. Moreover, if they were initially laid down with their longitudinal axes precisely vertical, they would require additional supports to keep the pipes in the desired position since they lack stability.

SUMMARY OF THE INVENTION

With these points in view, the object of the present invention is to provide a water discharge or drain pipe wherein an installing portion having a continuous or discontinuous bottom surface is formed in the longitudinal axial direction integral with or detatchable to the outer periphery of a synthetic resin pipe having an oval section, said bottom surface being perpendicular to the longitudinal axis of said oval section and extending along the axial direction of the pipe.

The oval form referred to in this invention does not intend to mean only the so-called elliptical shape, but it means to designate shapes similar to the ellipse, for example, oval or egg-shaped cross section.

DETAILED DESCRIPTION OF THE INVENTION

Figure 1:
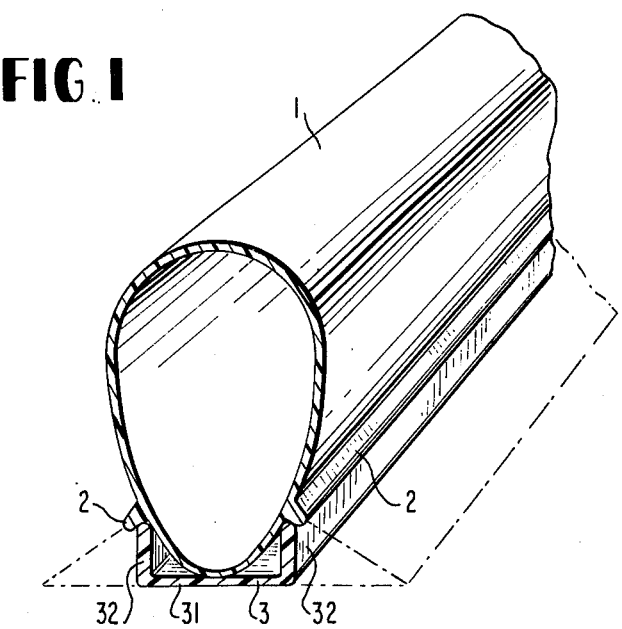
FIGS. 1 and 2 are perspective views showing first and second examples of a drain pipe according to the present invention.

Referring to FIG. 1, a synthetic resin pipe 1 having an oval or egg-shaped cross section, also includes two projecting ridges 2 provided at the lower side of the pipe symmetrically and continuously along the axial direction of the pipe. The installing portion of the pipe 1 comprises ridges 2 and detachable plate 3. The plate 3 which is of U-shape directly facing and in contact with the resin pipe 1 of oval or egg shape and comprising a unitary synthetic resin member and has a flat bottom part, 31, adapted to lie horizontally on a horizontal surface, e.g., the floor of a ditch, during installation, and two side wall members 32 extending upwardly from the side edges of the plate 31. The vertical height of the side walls is sufficient to hold the pipe 1 by allowing the underside of ridges 2 to rest on the side walls, while at the same time causing the lowest portion of the oval shaped cross section to rest on or slightly above the bottom part 31.

Figure 2:
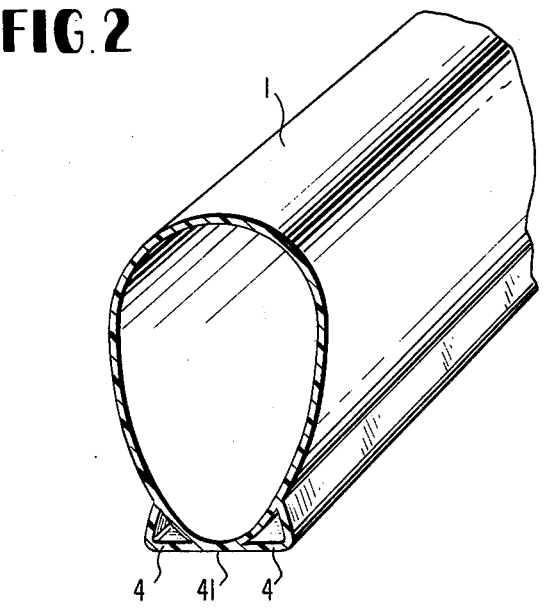

In the embodiment shown in FIG. 2, the installing portion of the pipe is integral with the pipe and comprises a flat base part, 41, for horizontal positioning of the pipe during installing. The flat part, as in the case of FIG. 1, is perpendicular to the longitudinal axis of the oval cross sectional shape, and positioned adjacent the narrowest part of the oval shaped pipe. Th installing part also comprises a pair of upwardly extending walls 4 integral with both the flat part 41 and the oval outer circumference of pipe 1. The walls or ribs 4 provide structural support. The pipe 1 and installing portion of FIG. 2 may be formed by a single extruding operation.

In both examples, the installing portions need not be continuous along the entire axial length of the pipe 1, but instead may be discontinuous. For example, the installation portion may be periodically positioned along the axial length of the pipe 1.

As stated above, since an installing portion of an oval shaped drain pipe according to the present invention has a flat bottom surface perpendicular to the major axis of the oval shape, it is possible to install the pipe stably with the major axis of the oval section directed vertical by merely placing the flat part of the installing portion on the surface where the pipe is to be installed. The pipe installation work, such as burying, etc., can be carried out extremely easily, and moreover, after installation, the drain pipes will hardly sink because of the flat and large contact area of the bottom surface with the earth.

What is claimed is:

1. In combination, a synthetic resin drain pipe and an underlying synthetic resin support plate, said drain pipe being adapted for substantially horizontal installation along the flow axis of said pipe and being of oval cross-section, with the major axis extending vertically, said support plate comprising a flat portion and integral sidewalls bent upwardly from the flat portion with said plate being of U-shape cross-section and directly facing and underlying said oval drain pipe, a pair of ridges extending integrally from opposed sides of said oval drain pipe near the bottom thereof with said ridges being formed on said oval drain pipe and said said oval drain pipe and said flat plate having walls of vertical height such that said ridges abut the ends of said sidewalls and the bottom of said pipe abuts the surface of the flat plate intermediate of said sidewalls which directly faces said oval pipe to maintain said oval pipe in vertical orientation along its major axis to permit a greater depth of water therein at low water to maintain water flow through said drain pipe at considerable speed and prevent the accumulation of solid filth or sedimentation therein.

* * * * *